United States Patent
Lam et al.

(10) Patent No.: US 10,432,907 B2
(45) Date of Patent: Oct. 1, 2019

(54) ELECTRONIC SYSTEM FOR CREATING AN IMAGE AND A METHOD OF CREATING AN IMAGE

(71) Applicant: City University of Hong Kong, Kowloon (HK)

(72) Inventors: Miu Ling Lam, Kowloon (HK); Yaozhun Huang, Kowloon (HK); Sze Chun Tsang, Kowloon (HK); Bin Chen, Kowloon (HK)

(73) Assignee: CITY UNIVERSITY OF HONG KONG, Kowloon (HK)

(*) Notice: Subject to any disclaimer, the term of this patent is extended or adjusted under 35 U.S.C. 154(b) by 9 days.

(21) Appl. No.: 15/216,950

(22) Filed: Jul. 22, 2016

(65) Prior Publication Data

US 2018/0025532 A1    Jan. 25, 2018

(51) Int. Cl.
   *G06T 15/20*    (2011.01)
   *H04N 13/00*    (2018.01)
   *H04N 13/395*   (2018.01)
   *H04N 13/393*   (2018.01)

(52) U.S. Cl.
   CPC .......... *H04N 13/00* (2013.01); *H04N 13/393* (2018.05); *H04N 13/395* (2018.05)

(58) Field of Classification Search
   CPC ............... G06T 15/205; G06T 2200/08; G06T 2219/2008; G06T 7/20; G06T 17/00; G06T 15/50; G06T 2207/10081; G06T 11/003; G06T 19/20; G06T 1/0007; G06T 2200/04; G06T 15/08; G06T 15/20; G02B 27/2292; G02B 2027/014; G02B 26/101; G02B 2027/0141; H04N 13/049; H04N 13/0488; H04N 21/4122; H04N 2201/3273; H04N 5/74; H04N 9/3147; H04N 5/04; H04N 9/3102; H04N 5/2253; G03B 21/608; A61B 5/743; A61B 5/0077; G06F 1/1601; G06F 3/1446; G06F 2200/1612; Y10S 901/02; G06K 9/00664; G09F 19/02
   See application file for complete search history.

(56) References Cited

U.S. PATENT DOCUMENTS

| | | | |
|---|---|---|---|
| 2003/0025725 A1* | 2/2003 | Nie | G06T 9/004 715/719 |
| 2013/0293684 A1* | 11/2013 | Becker | G01B 11/245 348/47 |
| 2014/0252200 A1* | 9/2014 | Garsha | G02B 21/367 250/201.3 |
| 2016/0220212 A1* | 8/2016 | Duewer | A61B 6/027 |

* cited by examiner

*Primary Examiner* — Xilin Guo
(74) *Attorney, Agent, or Firm* — Renner Kenner Greive Bobak Taylor & Weber

(57) ABSTRACT

An electronic system and a method for creating an image includes a display arranged to display a plurality of two-dimensional representations within a three-dimensional space, wherein the plurality of two-dimensional representations are arranged to individually represent a portion of a three-dimensional object within the three-dimensional space; and an imager arranged to capture the plurality of two-dimensional representations being displayed within the three-dimensional space; wherein the plurality of two-dimensional representations in a plurality of predefined positions are combined to form an image representative of the three-dimensional object within the three-dimensional space.

26 Claims, 14 Drawing Sheets

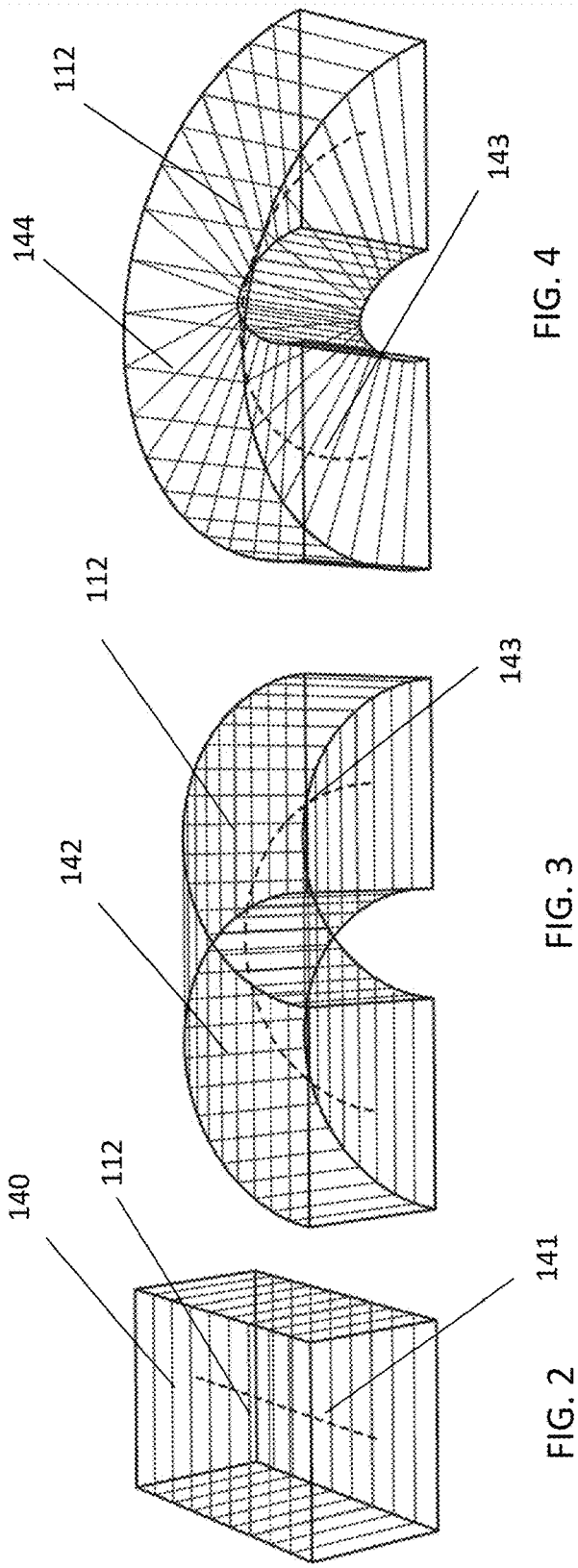

ELECTRONIC SYSTEM FOR CREATING AN IMAGE AND A METHOD OF CREATING AN IMAGE

TECHNICAL FIELD

The present invention relates to an electronic system for creating an image and a method for creating an image, and particularly, although not exclusively, to an electronic system for creating a three-dimensional image and a method of creating a three-dimensional image.

BACKGROUND

Photography and videos are the typical means for recording light or other electromagnetic radiations of real objects. Such visual information of the objects for presenting to one or more observers are generally captured electronically by means of image sensors such as CCD (Charge-coupled Device) and CMOS (Complementary Metal-oxide Semiconductor), or alternatively captured chemically by means of light-sensitive material such as photographic films. These electronically or chemically recorded materials may then be further processed by image editing software or by photographers in a darkroom.

In some advanced image editing processes, a number of captured images may be processed, for example, by superimposing into a single image and represented in a specific arrangement, thereby providing a visual impression of an object viewed at different angle to the observers. The perception of the observers may be confounded by the visual representation, such that their eyes are under a perception of viewing a real object or a virtual object appears to be a real object inserted into a real scene based on the visual information provided by the processed images.

SUMMARY OF THE INVENTION

In accordance with a first aspect of the present invention, there is provided a method for creating an image comprising the step of: displaying a plurality of two-dimensional representations within a three-dimensional space, wherein the plurality of two-dimensional representations are arranged to individually represent a portion of a three-dimensional object within the three-dimensional space; recording the plurality of two-dimensional representations being displayed within the three-dimensional space; and combining the plurality of two-dimensional representations in a plurality of predefined positions to form an image representative of the three-dimensional object within the three-dimensional space.

In an embodiment of the first aspect, the plurality of two-dimensional representations include a plurality of cross-sectional images each represents the portion of the three-dimensional object at each of the plurality of predefined positions within the three-dimensional space.

In an embodiment of the first aspect, the plurality of two-dimensional representations further include at least one of a plurality outline representations, filled representations, point cloud of the plurality of cross-sectional images of the three-dimensional object, and a plurality of cross-sectional images obtained from tomography.

In an embodiment of the first aspect, the plurality of predefined positions are spaced within the three-dimensional space.

In an embodiment of the first aspect, the method further comprises the step of moving a display arranged to display the plurality of two-dimensional representations relative to an imager arranged to capture the plurality of two-dimensional representations on the display.

In an embodiment of the first aspect, the display is mounted to a robotic mounting structure arranged to move the display such that the plurality of two-dimensional representations are displayed on the plurality of predefined positions within the three-dimensional space.

In an embodiment of the first aspect, the imager is mounted to a robotic mounting structure arranged to move the imager such that the plurality of two-dimensional representations are displayed on the plurality of predefined positions within the three-dimensional space, wherein the plurality of predefined positions are defined by a plurality of relative positions between the display and the imager.

In an embodiment of the first aspect, the display and/or the imager is moved with a combined linear and non-linear motion.

In an embodiment of the first aspect, the display and/or the imager is moved with a controlled movement.

In an embodiment of the first aspect, each the plurality of two-dimensional representations is displayed on an image plane of a flat-panel display.

In an embodiment of the first aspect, the flat-panel display is defined with a normal perpendicular to the image plane, and wherein the flat-panel display is arranged to move within the three-dimensional space such that the normal of the flat-panel display is kept tangent to a movement direction of the flat-panel display.

In an embodiment of the first aspect, the flat-panel display is arranged to move within the three-dimensional space with an orientation of the image plane being fixed when the flat-panel display is moving.

In an embodiment of the first aspect, the method further comprising the step of: capturing original image data of the three-dimensional object; and transforming the original image data to the plurality of two-dimensional representations to be displayed in the plurality of predefined positions.

In an embodiment of the first aspect, the three-dimensional object includes a virtual object.

In accordance with a second aspect of the present invention, there is provided an electronic system for creating an image, comprising: a display arranged to display a plurality of two-dimensional representations within a three-dimensional space, wherein the plurality of two-dimensional representations are arranged to individually represent a portion of a three-dimensional object within the three-dimensional space; and an imager arranged to capture the plurality of two-dimensional representations being displayed within the three-dimensional space; wherein the plurality of two-dimensional representations in a plurality of predefined positions are combined to form an image representative of the three-dimensional object within the three-dimensional space.

In an embodiment of the second aspect, the plurality of two-dimensional representations include a plurality of cross-sectional images each represents the portion of the three-dimensional object at each of the plurality of predefined positions within the three-dimensional space.

In an embodiment of the second aspect, the plurality of two-dimensional representations further include at least one of a plurality outline representations, filled representations, point cloud of the plurality of cross-sectional images of the three-dimensional object, and a plurality of cross-sectional images obtained from tomography.

In an embodiment of the second aspect, the plurality of predefined positions are spaced within the three-dimensional space.

In an embodiment of the second aspect, the display is moved with respect to the imager.

In an embodiment of the second aspect, the electronic system further comprises a robotic mounting structure arranged to mount and move the display such that the plurality of two-dimensional representations are displayed on the plurality of predefined positions within the three-dimensional space.

In an embodiment of the second aspect, the electronic system further comprises a robotic mounting structure arranged to mount and move the imager such that the plurality of two-dimensional representations are displayed on the plurality of predefined positions within the three-dimensional space, wherein the plurality of predefined positions are defined by a plurality of relative positions between the display and the imager.

In an embodiment of the second aspect, the display and/or the imager is moved with a combined linear and non-linear motion.

In an embodiment of the second aspect, the display and/or the imager is moved with a controlled movement.

In an embodiment of the second aspect, the display includes a flat-panel display defining an image plane with the plurality of two-dimensional representations displayed thereon.

In an embodiment of the second aspect, the flat-panel display is defined with a normal perpendicular to the image plane, and wherein the flat-panel display is arranged to move within the three-dimensional space such that the normal of the flat-panel display is kept tangent to a movement direction of the flat-panel display.

In an embodiment of the second aspect, the flat-panel display is arranged to move within the three-dimensional space with an orientation of the image plane being fixed when the flat-panel display is moving.

In an embodiment of the second aspect, the imager is further arrange to obtain an exposure to the three-dimensional space for a predetermined period of time so as to combine the plurality of two-dimensional representations being captured within the predetermined period of time.

In an embodiment of the second aspect, the electronic system further comprising a processor arranged to combine the plurality of two-dimensional representations captured by the imager.

In an embodiment of the second aspect, the electronic system further comprises: a source image capturing module arranged to capture original image data of the three-dimensional object; and a source image processing module arranged to transform the original image data to the plurality of two-dimensional representations to be displayed in the plurality of predefined positions.

In an embodiment of the second aspect, the three-dimensional object includes a virtual object.

In accordance with a third aspect of the present invention, there is provided an electronic system for creating an image, comprising: a display arranged to display a plurality of two-dimensional representations within a three-dimensional space, wherein the plurality of two-dimensional representations are arranged to individually represent a portion of a three-dimensional object within the three-dimensional space; and a robotic mounting structure arranged to move the display such that the plurality of two-dimensional representations are displayed in a plurality of predefined positions within the three-dimensional space; wherein an image representative of the three-dimensional object within the three-dimensional space is defined by combining the plurality of two-dimensional representations being displayed.

In an embodiment of the third aspect, the display includes a flat-panel display arranged to display the plurality of two dimensional representations.

In an embodiment of the third aspect, the electronic system further comprises an imager arranged to capture the plurality of two-dimensional representations being displayed.

BRIEF DESCRIPTION OF THE DRAWINGS

Embodiments of the present invention will now be described, by way of example, with reference to the accompanying drawings in which:

FIG. 2 is an illustration showing the swept-volume created by extrusion of the flat display along a straight line;

FIG. 3 is an illustration showing the swept-volume is created by extrusion of the display along a curved path while keeping the slicing orientation constant;

FIG. 4 is an illustration showing the swept-volume created by sweeping the display along the same curved path while each slicing plane is perpendicular to the tangent line of the curve;

DETAILED DESCRIPTION OF THE PREFERRED EMBODIMENT

Figure 1:
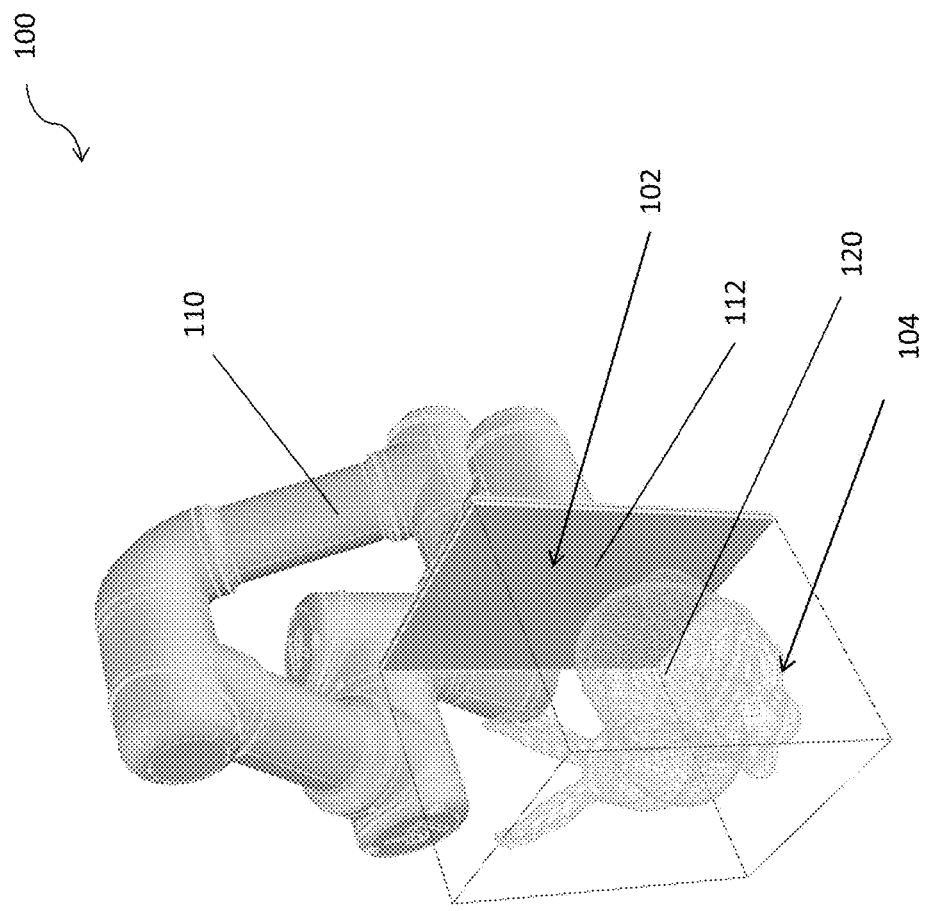
FIG. 1 is a perspective view of an electronic device for creating an image in accordance with one embodiment of the present invention.

The inventors have, through their own research, trials and experiments, devised that light painting is a photography technique in which light sources are moved in specific patterns while being captured by long exposure. The movements of lights will result in bright strokes or selectively illuminated and colored areas in the scene being captured, thus decorating the real scene with special visual effects without the need for post-production.

Light painting may also be used by professional media artists and photographers to produce aesthetic visual arts and commercial photography. In light paintings, the light sources may be flashlights or other simple handheld lights made by attaching one or multiple LEDs to a stick or a ring. The patterns created are limited to abstract shapes or freehand strokes.

Computational light painting is a more advanced technique to produce "representational" (in contrast to "abstract") visuals in which the shape and motion of the lights in every time instant during the exposure time are precisely computed and synchronized. Performing light painting in a computational manner may enable using digital means to create light strokes that are in controlled shapes and at accurate positions, and exhibit complex forms.

Preferably, the accuracy of computational light painting relies on the tight synchronization between light pattern and its motion. Robots and computer numerical control (CNC) systems may be used to execute light paths with high fidelity. For example, an RGB LED may be attached to the nozzle position of a FDM 3D printer to create 3D light painting. The color and intensity of the LED were controlled while the print head was moving in a digitally generated tool path, thus the printer may "print 3D light". However, the process is slow while only using a point of light to draw a 3D shape.

Besides point light source and 1D array of lights, a flat display may also be used as the illuminating device for light painting. The display pixels can be considered as a 2D array of densely-packed point light sources. And the display would create a swept volume when in motion. In an alternative example embodiment, a plasma TV may be attached to a robot that moved back and forth in a linear path. The motion may be synchronized to video and camera shutter to create a fluid simulation drawn in space.

Alternatively, rather than limiting the robot end effector to move linearly, the robot may travel in versatile curved paths to increase the displayable area.

In some alternative examples, the present technique can also be deployed without the need for any robotic arms such that the display and the camera may be arranged to move with respect to each other. For example, the display can be moved by hands, machines/devices/vehicles or any other movable objects, or alternatively, the camera may be mounted to the robotic arm or by hands, machines/devices/vehicles or any other movable objects such that the relative motion between the display and the camera, with the aiding of software and sensors, may achieve the present invention.

Figure 5:
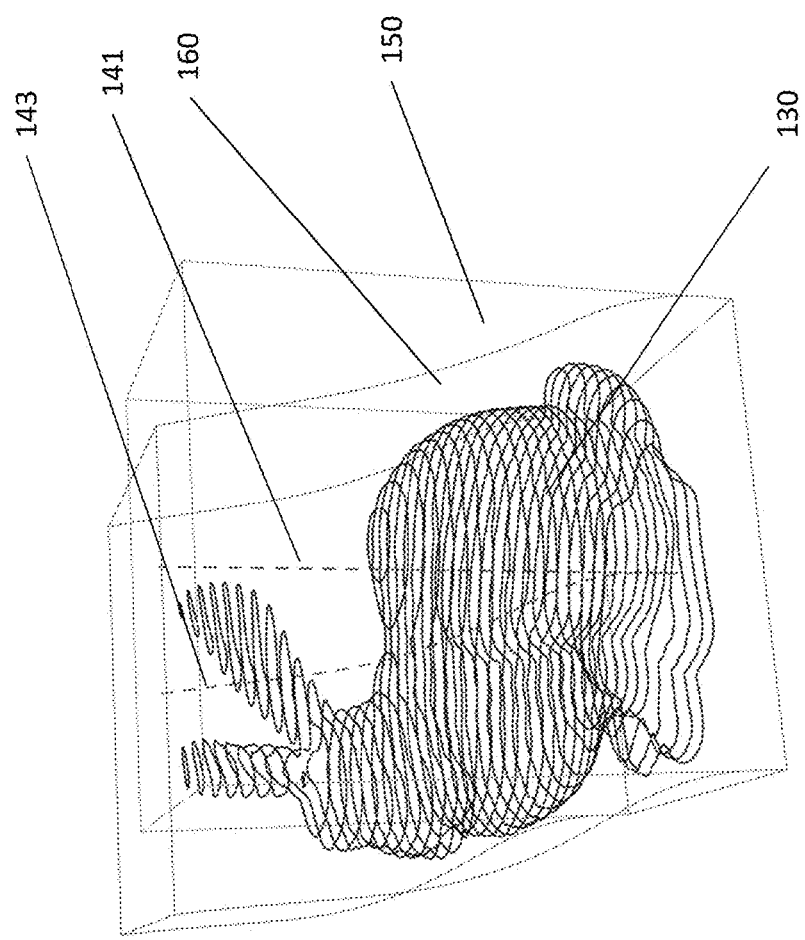
FIG. 5 is an illustration showing the simulated object resembled by the display with linear and non-linear motions.

With reference to FIG. 1 and FIG. 5, there is provided an example embodiment of an electronic system 100 for creating an image, comprising: a display 102 arranged to display a plurality of two-dimensional representations 130 within a three-dimensional space 104, wherein the plurality of two-dimensional representations 130 are arranged to individually represent a portion of a three-dimensional object 120 within the three-dimensional space 104; and an imager 106 arranged to capture the plurality of two-dimensional representations 130 being displayed within the three-dimensional space 104; wherein the plurality of two-dimensional representations 130 in a plurality of predefined positions are combined to form an image representative of the three-dimensional object within the three-dimensional space.

In this embodiment, the electronic system 100 comprises a display 102 (such as a flat panel display) and an imager 106. The display 102 is arranged to create a plurality of two-dimensional representations 130 from an image representative of a three-dimensional object 120. For example, the two-dimensional representations may represent the cross-section profiles of the virtual object 120 that is sliced at different positions and/or orientations.

Preferably, these two-dimensional representations 130 are displayed on a flat-panel display 112, which is used as an illuminating device for light painting. For example, the two-dimensional representations 130 displayed on the flat-panel display 112 may be a video or a series of images that is rendered in real-time. The portions of the three-dimensional object may be presented as a plurality of cross-sectional images at a plurality of predesigned positions. Alternatively, each frame may represent a profile, a contour or an outline representation of a cross-section of the object 120. Alternatively, each frame may represent a filled representation or point cloud of a cross-section of the object 120. The plurality of predefined positions may be evenly spaced within the three dimensional space, which may enhance the accuracy of computational light painting according to a tight synchronization between the content in display 112 and its motion. Optionally, the three-dimensional object 120 may be a CAD drawing, or generated from a 3D scanner.

Figure 16:
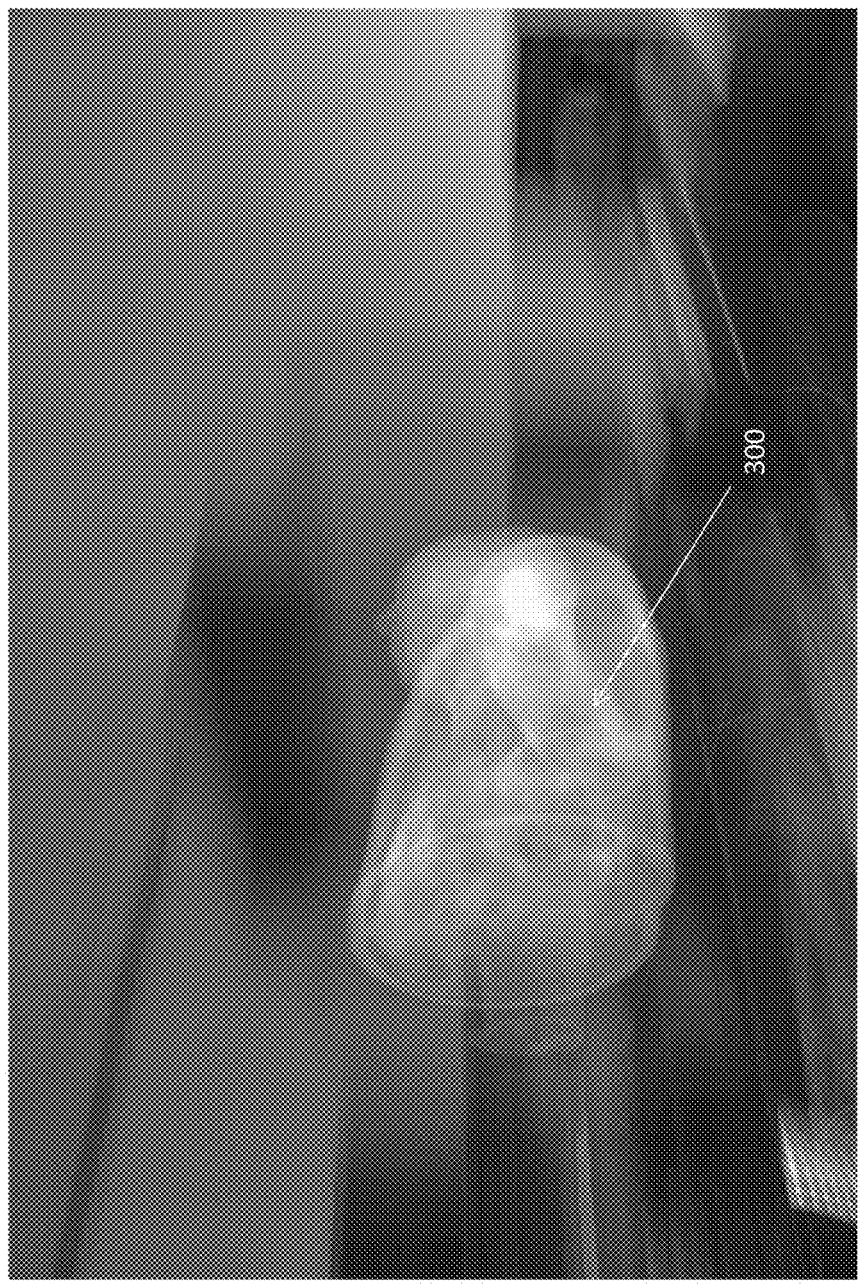
FIG. 16 is an illustration of a visual image of an upper human body showing that 3D volumetric data can be visualized by displaying and combining a plurality of 2D image representing the cross-section information of the 3D object with coloured pixels.

In one example embodiment, each frame may represent a cross-section image and the combined cross-section image of the frames forms a graphical representation of the three-dimensional volumetric data obtained from tomography. During tomography, three-dimensional volumetric data are collected, and these volumetric data are visualized in the form of graphical representation by displaying the cross-section information of the three-dimensional object with coloured pixels 300. The plurality of cross-section information is then stacked to form a three-dimensional representation, which may be an example visual image of an upper human body as shown in FIG. 16.

Optionally, the electronic system may further comprises a source image capturing module arranged to capture original image data of the three-dimensional object; and a source image processing module arranged to transform the original image data to the plurality of two-dimensional representations to be displayed in the plurality of predefined positions. The source image capturing module may be provided as a same or different imager for capturing images which represent an original three-dimensional object 120, and the source image processing module may be provided in a computer for processing the original image data obtained by the source image capturing module so as to transform the image data to the required plurality of two-dimensional representations and the positional information of displaying each of these two-dimensional representations.

Preferably, a robotic mounting structure 110 may be used to mount and move the flat-panel display 112 and/or the imager 106. Robots and computer numerical control (CNC) systems may be used to execute light paths with high fidelity, such that the display and/or the imager may be moved with a controlled movement.

For example, the flat-panel display 112 may be mounted to the robotic mounting structure 110, e.g. a 6-axis robotic manipulator Universal Robot UR10 for moving the display 112 to precise positions and orientations at controlled speed within the three-dimensional space 104. A plurality of two-dimensional, synchronized images or representations 130 with a predefined sequence may be displayed on the flat-panel display 112, in the form of video in real-time during the movement of the robotic mounting structure 110 relative to the imager 106. Therefore, the pixels of display 112 act as a two-dimensional array of densely-packed point light sources, such that the display 112 may create a swept-volume in a three-dimensional space when the display 112 is in motion together with the robotic mounting structure 110.

Figure 13:
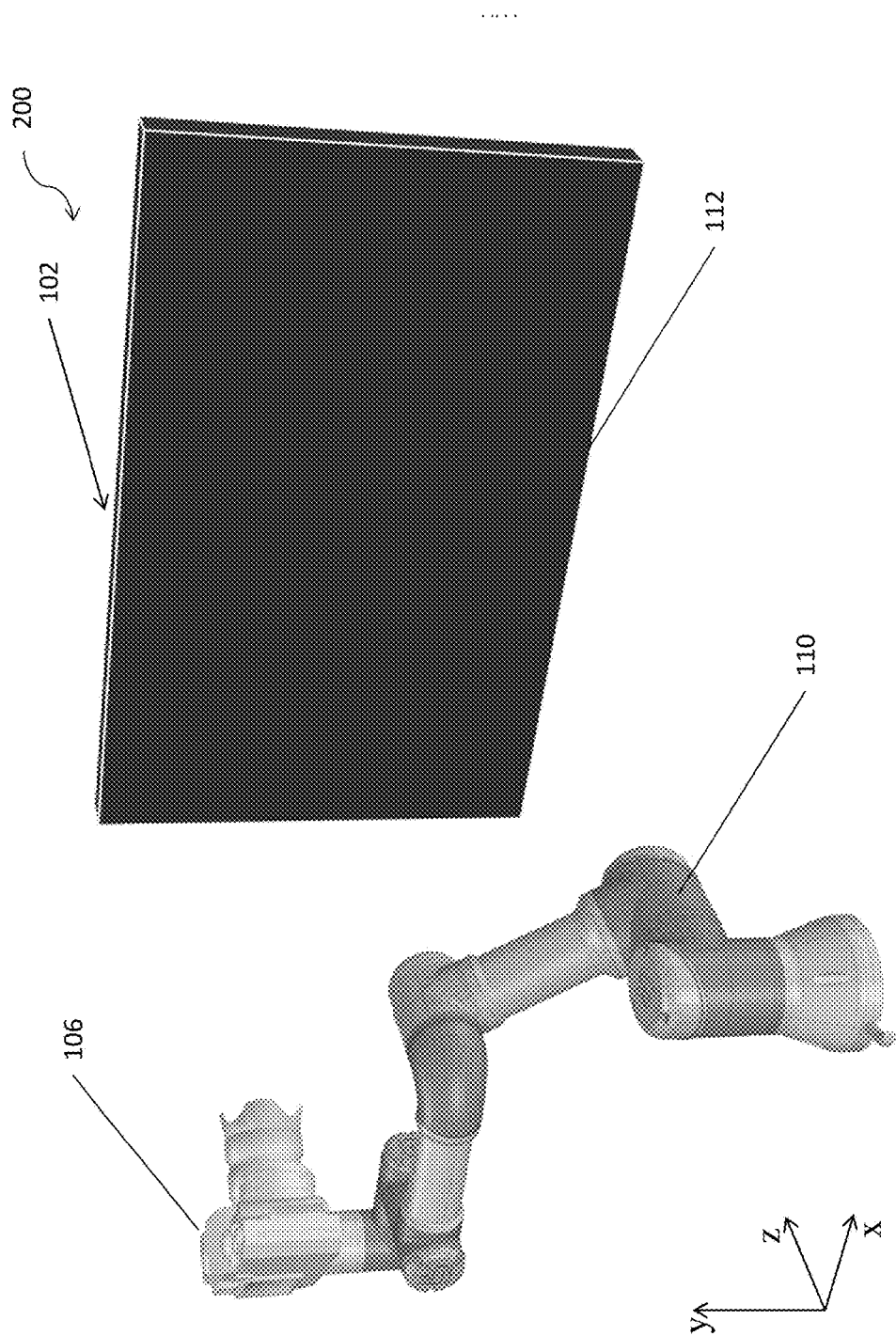
FIG. 13 is a perspective view of an electronic device for creating an image in accordance with another embodiment of the present invention.
Figure 14:
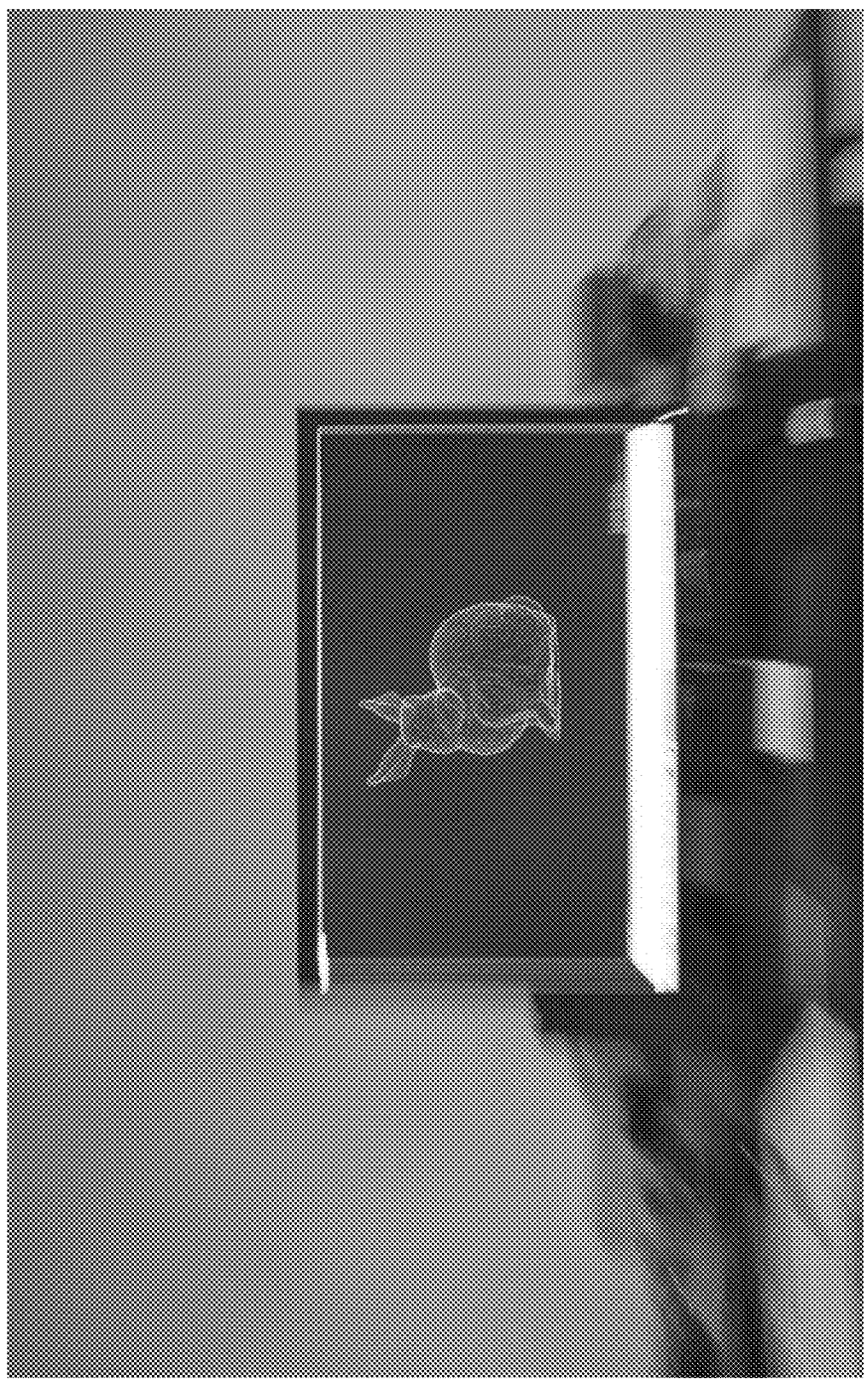
FIG. 14 is an illustration of a visual image of a Stanford bunny displayed on an imager based on the arrangement of system 200 in FIG. 13.
Figure 15:
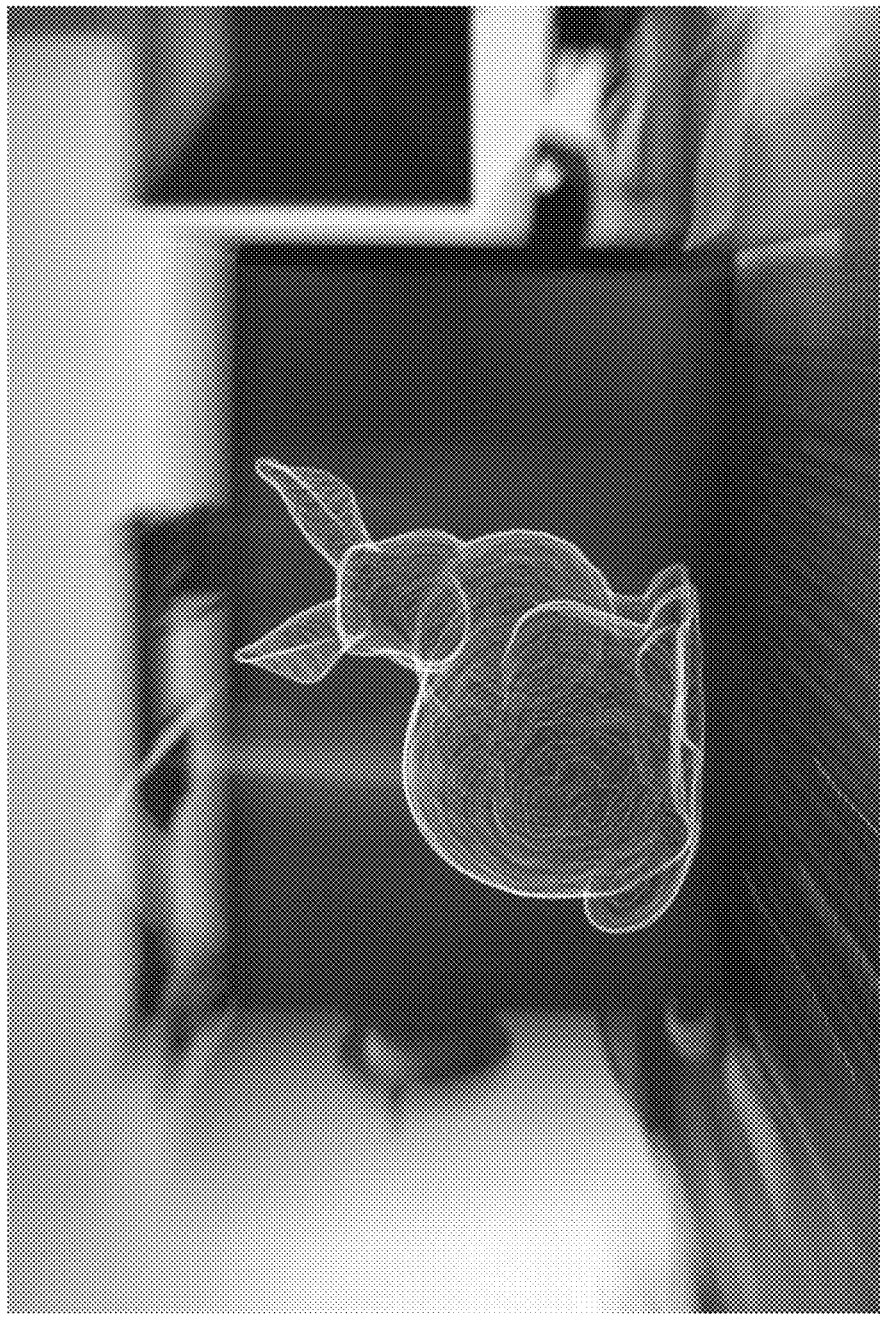
FIG. 15 is an illustration of another visual image of a Stanford bunny displayed on an imager based on the arrangement of system 200 in FIG. 13.

Alternatively, as shown in FIG. 13, the electronic system 200 comprises a display 102 (such as a flat panel display 112) and an imager 106. The imager 106 may be mounted to the robotic mounting structure 110, such that the robotic mounting structure 110 may move the imager 106 and that the plurality of two-dimensional representations may be displayed on a plurality of relative positions between the display 112 and the imager 106, which are equivalent to the plurality of predefined positions within the three-dimensional space.

Advantageously, the representational visual of the virtual object 120 i.e. the shape and motion of the display 112 in every time instant during the exposure time are precisely computed and synchronized. Moving the plurality of two-dimensional representations 130 on the display 112 in a computational manner may facilitate the use of digital means to create light strokes that are in controlled shapes and at accurate positions, and exhibit complex forms, which is impossible by conventional method.

Preferably, the motion of the display 112 may be synchronized to video and imager 106 to create a fluid simulation drawn in the three-dimensional space 104. As devised by the inventor, the robotic mounting structure 110 is not limited to move linearly, such that the robot are allowed to travel in versatile curved paths to increase the displayable area by the display 112.

With reference again to FIG. 1, the instantaneous robot configuration is monitored by software. The joint positions are used to compute the 6-DOF pose of the display 112. The display 112 position and orientation are then used to define the cutting plane and compute the cross-section of the virtual object 120 on the plane. Only one slice at a time is obtained. The z-direction, coordinate and boundary of the display 112 are input to obtain the slices. When the display 112 is moved by the robotic mounting structure 110, it creates a swept-volume and a stack of contours in the three-dimensional space 104 that represent the three-dimensional shape of the virtual object 120. Preferably, the motion path of the display 112 and/or the imager 106 is not constrained to linear motions, i.e. the display and/or the imager may be moved with a non-linear motion. As devised by the inventor, curved path and rotated slicing planes may be preferable as this may increase the swept-volume and display space to create enhanced two-dimensional representation 130 for combining into a three-dimensional representation.

It would be appreciated by person skilled in the art that it is possible to mount both of the display 112 and the imager 106 to individual robotic mounting structures 110 for moving with respect to each other within the three-dimensional space 104.

Figure 10:
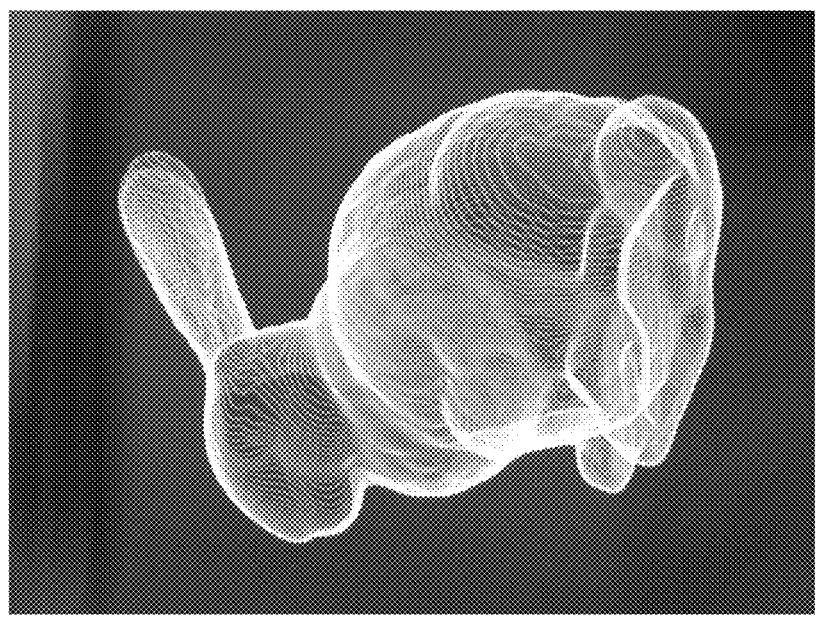
FIG. 10 is an illustration of a visual image of a Stanford bunny displayed on an imager based on the arrangement of system 100 in FIG. 1.
Figure 12:
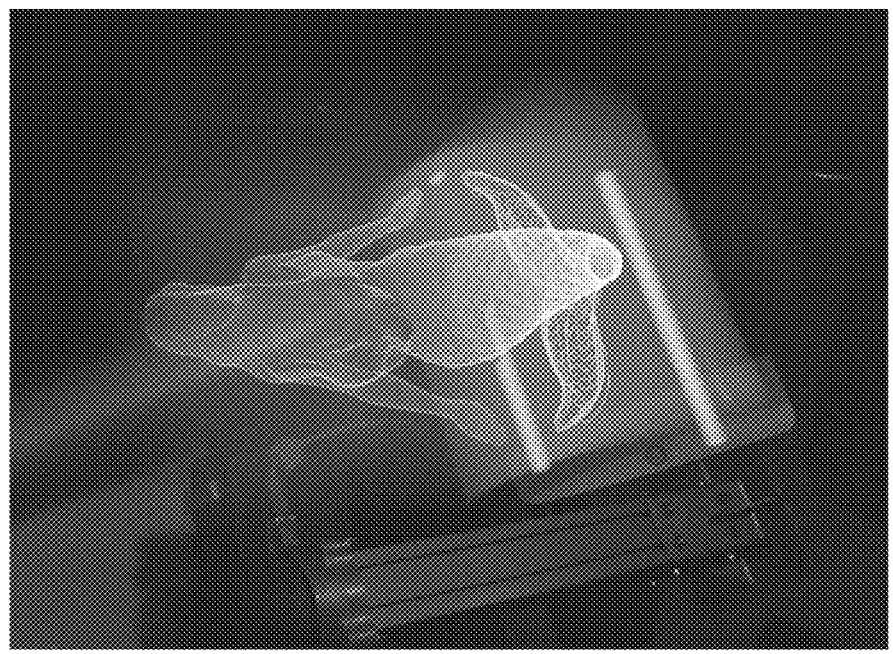
FIG. 12 is another an illustration of a visual image of a mermaid displayed on an imager based on the arrangement of system 100 in FIG. 1.

In this embodiment, the imager 106 e.g. a camera 106 may be used to collect the two-dimensional representations 130 displayed by the flat-panel display 112. The plurality of captured images may be further combined by a processor in the camera 106 into a three-dimensional representation which may be an example visual image of a Stanford bunny as shown in FIG. 10. Another visual image of a mermaid as shown in FIG. 12 is also obtained by adopting the same arrangement of system 100. The processor may reside separately in the electronic system, for example a processing module in a computer device may be used to combine the two-dimensional representations being captured and/or recorded.

In the aforementioned alternative embodiment, the imager 106 of the electronic system 200 may be used to collect the two-dimensional representations 130 displayed by the flat-panel display 112 in the same manner. The plurality of captured images may be further combined by a processor in the camera 106 into a three-dimensional representation which may be example visual images of a Stanford bunny as shown in FIGS. 12 and 13.

Alternatively, the camera may operate in a long exposure mode such that the imager (such as a film) may obtain an exposure to the three-dimensional space for a predetermined period of time so as to combine the plurality of two-dimensional representations being captured within the predetermined period of time.

Figure 11:
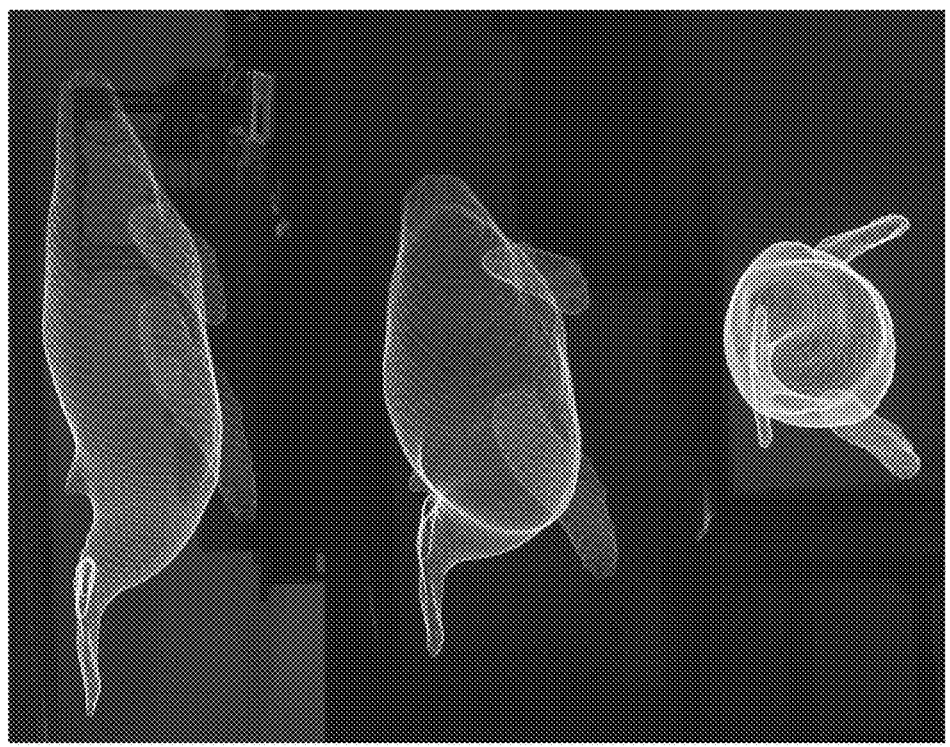
FIG. 11 is an illustration of a plurality of visual images of a whale displayed on imagers located at various location.

Advantageously, multiple imagers 106 may be placed in various locations within the three-dimensional space 104 to obtain the two-dimensional representations 130 displayed on the display 112 from wide viewing angles. An IPS display readily available in the market may support a wide viewing angle of 178 degrees. As such, by moving the display with changing orientations, a plurality of three-dimensional representations, for example, three visual images of a whale from different view angles captured by three cameras 106 as shown in FIG. 11 may be obtained.

It would be appreciated by person skilled in the art that the present technique may also be applied to capture images that contain both virtual and real-world objects simultaneously which are similar to augmented reality.

Alternatively, the present technique can also be used without the need for any robot arms 110. The display 112 can be moved by hands, machines/devices/vehicles or any other movable objects. To achieve synchronized motion and image, motion capture (MoCap) or other pose estimation techniques such as SLAM and visual odometry (which involve the use of sensors including accelerometer, gyroscope and camera) may be used to acquire the instantaneous position and orientation of the display 112. The display's pose is then used to define the slicing plane corresponding to the virtual objects 120 as abovementioned.

With reference to FIGS. 2 to 4, there are shown three different swept-volumes created by the movement of the display 112. The swept-volume 140 in FIG. 2 is created by extrusion of the flat display 112 along a straight line 141. The swept-volume 142 in FIG. 3 is created by extrusion of the display 112 along a curved path 143 while keeping the slicing orientation, i.e. the display 112 constant. The display 112 in FIG. 3 is in three-dimensional translation motion. To the contrary, the swept-volume 144 in FIG. 4 is created by sweeping the display 112 along the same curved path 143 while each slicing plane, i.e. the display 112 is perpendicular to the tangent line of the curve 143, thus the swept-volume 144 is maximized. As devised by the inventor, although the path curves in FIGS. 3 and 4 are identical, the swept-volume 142 of FIG. 3 is generally a subspace of swept-volume 144 of FIG. 4. The swept-volume 144 of FIG. 4 covers a larger three-dimensional space 104 than the swept-volume 142 of FIG. 3.

With reference to FIG. 5, there is shown a comparison between the simulated object resembled by the plurality of two-dimensional representations 130 shown on the display 112 with linear and non-linear motions. In this embodiment, part of the virtual object 120 (not shown) is not covered by the swept-volume 150 using linear path 141. As devised by the inventor, the swept-volume 160 can fully cover the object 120 by using the same display 112 with a curved path 143 that accommodates the object shape without changing the display 112 direction. The comparison shows that pure linear motions 141 would limit the three-dimensional workspace 104 and thus non-linear swept path, i.e. curved path 143 providing increased displayable area is more desirable for the system 100.

Figure 6:
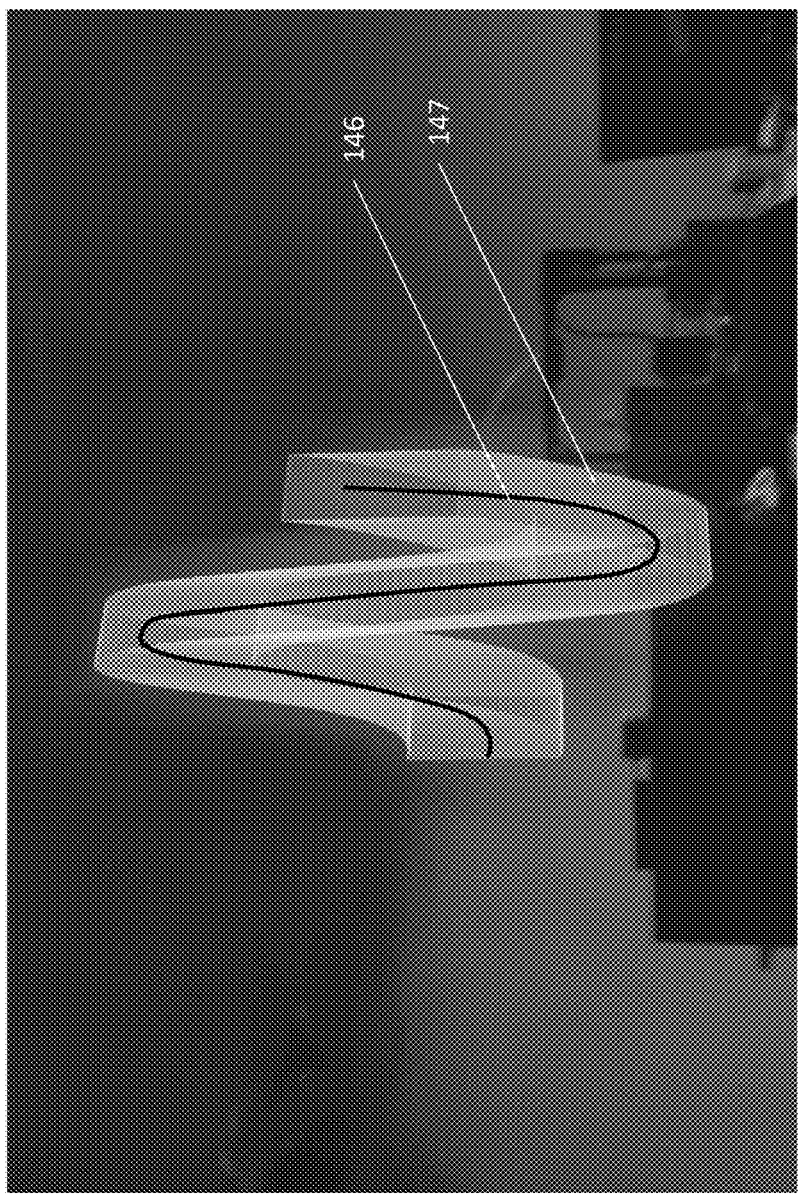
FIG. 6 is an illustration showing the movement of the display extruding along curved path with fixed orientation.

With reference to FIG. 6 there is shown a swept-volume 147 created by the movement of the display 112 extruding along curved path 146 with fixed orientation. The flat-panel display 112 is arranged to move within the three-dimensional space 104 with a movement direction such that the orientation of the display 112, or alternatively the relative orientation of the display 112 with respect to the imager 106 is fixed. The orientation of the display 112 with respect to the imager 106 is maintained throughout the movement along curved path 146.

Figure 7:
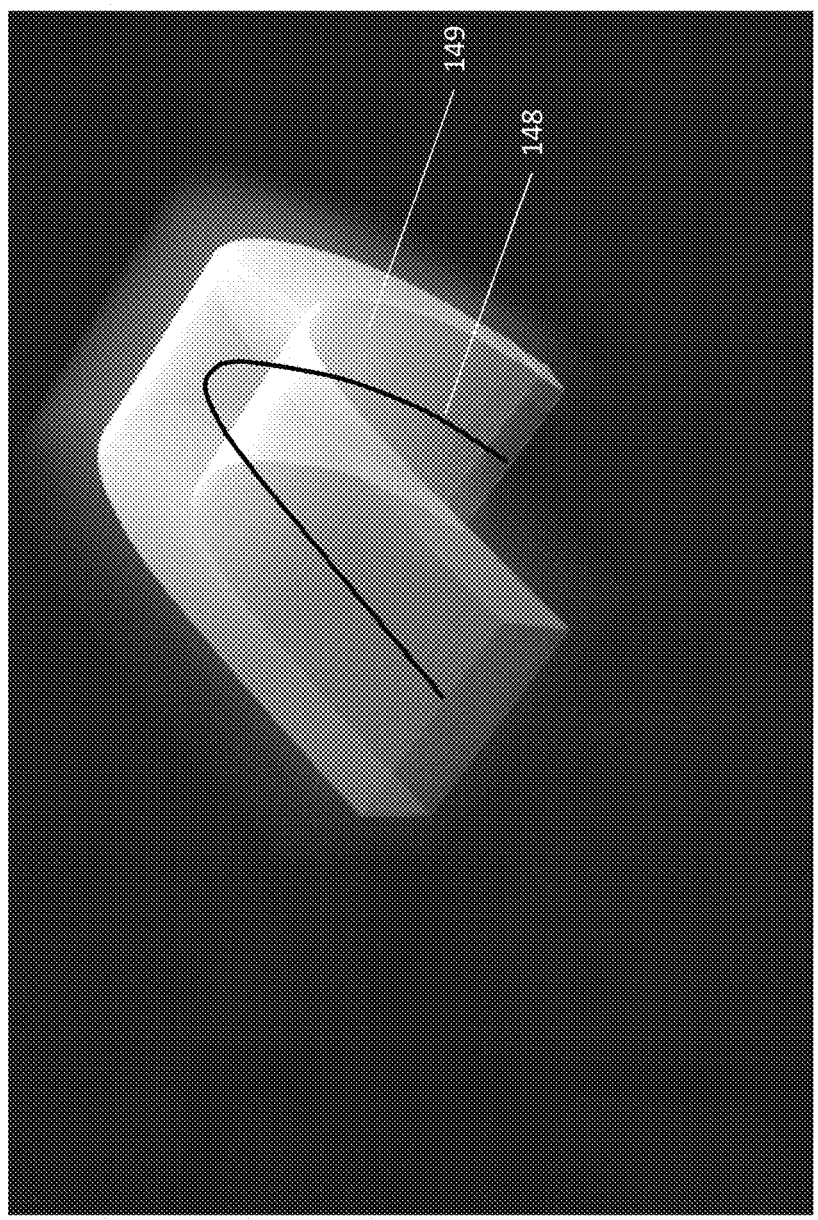
FIG. 7 is an illustration showing the movement of the display sweeping along curved path with changing orientation.
Figure 8:
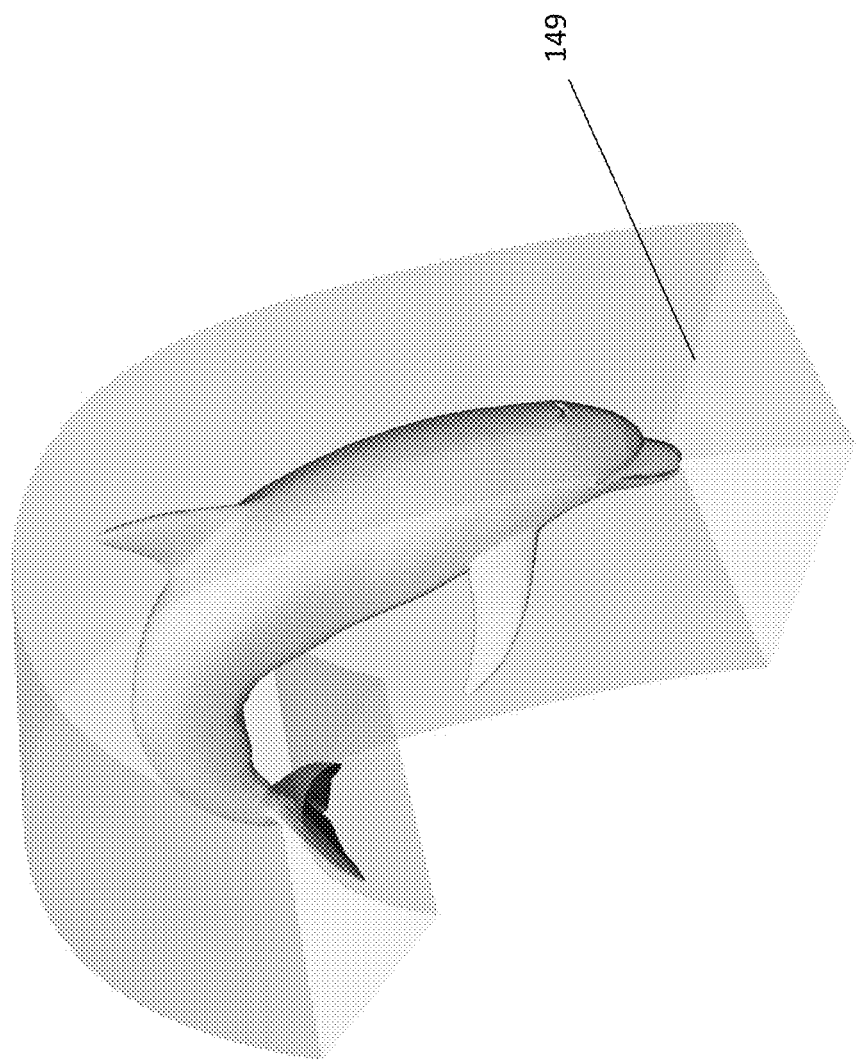
FIG. 8 is an illustration showing the virtual dolphin represented by the display sweeping along curved path with changing orientation of FIG. 7.
Figure 9:
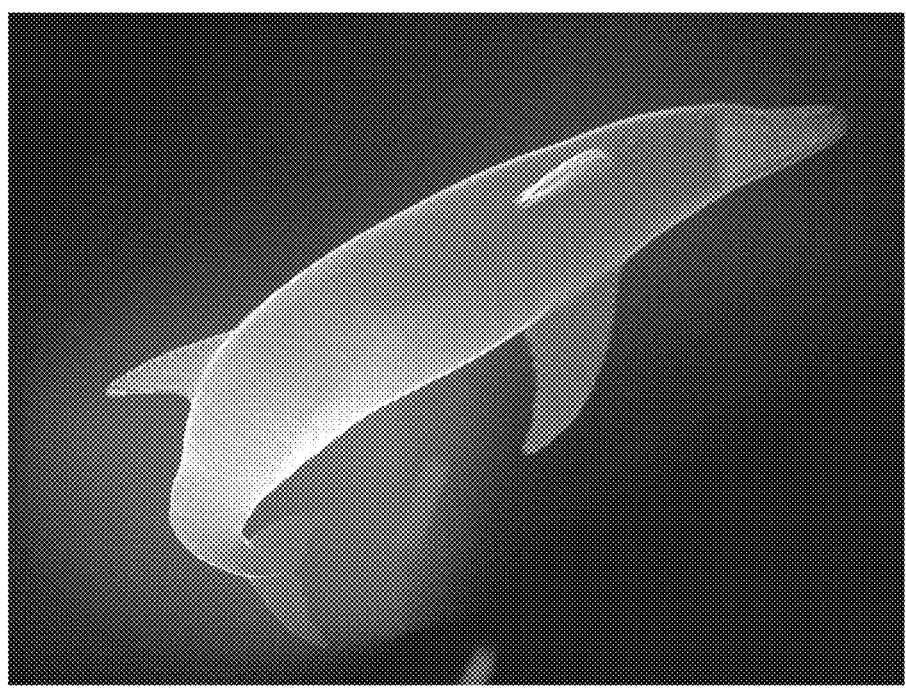
FIG. 9 is an illustration of a visual image of a dolphin displayed on an imager from the swept-volume of display of FIG. 8.

With reference to FIG. 7 there is shown another swept-volume 149 created by movement of the display 112 sweeping along another curved path 148 with changing orientation. Preferably, the flat-panel display 112 in this embodiment is defined with a normal perpendicular to an image plane where the two-dimensional representations are displayed thereon, and the flat-panel display 112 is arranged to move within the three-dimensional space 104 with a movement direction such that the normal of the display 112 is kept tangent to the movement direction of the display 112. FIG. 8 shows the simulated virtual dolphin represented by the swept-volume 149 through extruding the display 112 along the curved path 148 while keeping the normal of the display 112 tangent to the path 148, and FIG. 9 shows a visual image of the dolphin captured by the imager 106 based on the path curve 148 and the swept-volume 149 in FIGS. 7-8. The visual image in FIG. 9 is resembled by the capturing the plurality of two-dimensional representation on the display 112, i.e. the swept-volume 149.

In an alternative embodiment, the electronic system for creating an image comprises a display arranged to display a plurality of two-dimensional representations within a three-dimensional space, wherein the plurality of two-dimensional representations are arranged to individually represent a portion of a three-dimensional object within the three-dimensional space; and a robotic mounting structure arranged to move the display such that the plurality of two-dimensional representations are displayed in a plurality of predefined positions within the three-dimensional space; wherein an image representative of the three-dimensional object within the three-dimensional space is defined by combining the plurality of two-dimensional representations being displayed.

In this example, the image representative of the three dimensional object may be visualized or "seen" by a human eye or a biological vision, an optional imager may be included to record or capture the two-dimensional representations displayed for generating an image or a record with the image representative of the three dimensional object in the three-dimensional space.

These embodiments may be advantageous in that the combination of two-dimensional displays, robotic arms and cameras have a wide range of applications in all disciplines, from art, design and entertainment, to engineering and scientific visualization, medical imaging and tele-presence.

Advantageously, the electronic system employs swept-volume displays, such as flat-panel display in motion, to produce a series of fast-moving two-dimensional slices of the virtual three-dimensional object and further combine the plurality of captured two-dimensional representations into a single three-dimensional representation. The cross-section profiles of a virtual object may be sliced at arbitrary positions and orientations as desirable by the user. The image content in the display is tightly synchronized to the robotic arm motion, which may be a combined linear and non-linear motion to increase the displayable area, thereby providing enhanced two-dimensional representations for creating a fully covered three-dimensional image.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for creating an image comprising the steps of:
    displaying a plurality of two-dimensional representations on a display within a three-dimensional space, wherein the plurality of two-dimensional representations are arranged to each individually represent a unique portion of a three-dimensional object within the three-dimensional space;
    moving the display with a robotic mounting structure arranged to move the display such that the plurality of two-dimensional representations are displayed in a plurality of predefined positions within the three-dimensional space;
    recording the plurality of two-dimensional representations being displayed within the three-dimensional space with an imager arranged to capture the plurality of two-dimensional representations being displayed within the three-dimensional space; and
    combining the plurality of two-dimensional representations recorded in said step of recording in a plurality of predefined positions to form a single image representative of the three-dimensional object within the three-dimensional space.

2. The method according to claim 1, wherein the plurality of two-dimensional representations include a plurality of cross-sectional images each represents the portion of the three-dimensional object at each of the plurality of predefined positions within the three-dimensional space.

3. The method according to claim 2, wherein the plurality of two-dimensional representations further include at least one of a plurality outline representations, filled representations, point cloud of the plurality of cross-sectional images of the three-dimensional object, and a plurality of cross-sectional images obtained from tomography.

4. The method according to claim 1, further comprises the step of moving a display arranged to display the plurality of two-dimensional representations relative to an imager arranged to capture the plurality of two-dimensional representations on the display.

5. The method according to claim 4, wherein the display and/or the imager is moved with a controlled movement.

6. The method according to claim 1, wherein each the plurality of two-dimensional representations is displayed on an image plane of a flat-panel display.

7. The method according to claim 6, wherein the flat-panel display is defined with a normal perpendicular to the image plane, and wherein the flat-panel display is arranged to move within the three-dimensional space such that the normal of the flat-panel display is kept tangent to a movement direction of the flat-panel display.

8. The method according to claim 6, wherein the flat-panel display is arranged to move within the three-dimensional space with an orientation of the image plane being fixed when the flat-panel display is moving.

9. The method according to claim 1, further comprising the step of:
capturing original image data of the three-dimensional object; and
transforming the original image data to the plurality of two-dimensional representations to be displayed in the plurality of predefined positions.

10. The method according to claim 1, wherein the three-dimensional object includes a virtual object.

11. A method for creating an image comprising the steps of:
displaying a plurality of two-dimensional representations on a display within a three-dimensional space, wherein the plurality of two-dimensional representations are arranged to each individually represent a unique portion of a three-dimensional object within the three-dimensional space;
recording the plurality of two-dimensional representations being displayed within the three-dimensional space with an imager arranged to capture the plurality of two-dimensional representations being displayed within the three-dimensional space;
moving the imager with a robotic mounting structure arranged to move the imager such that the plurality of two-dimensional representations are displayed on the plurality of predefined positions within the three-dimensional space, wherein the plurality of predefined positions are defined by a plurality of relative positions between the display and the imager; and
combining the plurality of two-dimensional representations recorded in said step of recording in a plurality of predefined positions to form a single image representative of the three-dimensional object within the three-dimensional space.

12. An electronic system for creating an image, comprising:
a display arranged to display a plurality of two-dimensional representations within a three-dimensional space, wherein the plurality of two-dimensional representations are arranged to each individually represent a unique portion of a three-dimensional object within the three-dimensional space;
a robotic mounting structure arranged to mount and move the imager such that the plurality of two-dimensional representations are displayed on the plurality of predefined positions within the three-dimensional space, wherein the plurality of predefined positions are defined by a plurality of relative positions between the display and the imager; and
an imager arranged to capture the plurality of two-dimensional representations being displayed within the three-dimensional space;
wherein the plurality of two-dimensional representations captured by the imager are combined in a plurality of predefined positions to form a single image representative of the three-dimensional object within the three-dimensional space.

13. The electronic system according to claim 12, wherein the plurality of two-dimensional representations include a plurality of cross-sectional images each represents the portion of the three-dimensional object at each of the plurality of predefined positions within the three-dimensional space.

14. The electronic system according to claim 13, wherein the plurality of two-dimensional representations further include at least one of a plurality outline representations, filled representations, point cloud of the plurality of cross-sectional images of the three-dimensional object, and a plurality of cross-sectional images obtained from tomography.

15. The electronic system according to claim 12, wherein the display is moved with respect to the imager.

16. The electronic system according to claim 15, further comprising a robotic mounting structure arranged to mount and move the display such that the plurality of two-dimensional representations are displayed on the plurality of predefined positions within the three-dimensional space.

17. The electronic system according to claim 15, wherein the display and/or the imager is moved with a controlled movement.

18. The electronic system according to claim 12, wherein the display includes a flat-panel display defining an image plane with the plurality of two-dimensional representations displayed thereon.

19. The electronic system according to claim 18, wherein the flat-panel display is defined with a normal perpendicular to the image plane, and wherein the flat-panel display is arranged to move within the three-dimensional space such that the normal of the flat-panel display is kept tangent to a movement direction of the flat-panel display.

20. The electronic system according to claim 18, wherein the flat-panel display is arranged to move within the three-dimensional space with an orientation of the image plane being fixed when the flat-panel display is moving.

21. The electronic system according to claim 12, wherein the imager is further arrange to obtain an exposure to the three-dimensional space for a predetermined period of time so as to combine the plurality of two-dimensional representations being captured within the predetermined period of time.

22. The electronic system according to claim 12, further comprising a processor arranged to combine the plurality of two-dimensional representations captured by the imager.

23. The electronic system according to claim 12, further comprising:
a source image capturing module arranged to capture original image data of the three-dimensional object; and
a source image processing module arranged to transform the original image data to the plurality of two-dimensional representations to be displayed in the plurality of predefined positions.

24. The electronic system according to claim 12, wherein the three-dimensional object includes a virtual object.

25. An electronic system for creating an image, comprising:
a display arranged to display a plurality of two-dimensional representations within a three-dimensional space, wherein the plurality of two-dimensional representations are arranged to each individually represent a unique portion of a three-dimensional object within the three-dimensional space; and
a robotic mounting structure arranged to move the display such that the plurality of two-dimensional representations are displayed in a plurality of predefined positions within the three-dimensional space;

an imager arranged to capture the plurality of two-dimensional representations being displayed within the three-dimensional space;

wherein a single image representative of the three-dimensional object within the three-dimensional space is defined by combining the plurality of two-dimensional representations being displayed.

26. The electronic system according to claim 25, wherein the display includes a flat-panel display arranged to display the plurality of two dimensional representations.

* * * * *